(12) United States Patent
Townsend et al.

(10) Patent No.: US 6,220,472 B1
(45) Date of Patent: Apr. 24, 2001

(54) BAFFLE FOR A LIQUID TANK

(75) Inventors: David Townsend, Bristol (GB); Serguei T Zavtrak, Auckland (NZ); Rognvald S McEwen, Bristol (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/457,265

(22) Filed: Dec. 9, 1999

(30) Foreign Application Priority Data

Dec. 9, 1998 (GB) .................................................. 9826936

(51) Int. Cl.$^7$ ........................................................ B60P 3/00
(52) U.S. Cl. ............................................................ 220/563
(58) Field of Search .................................. 220/563, 562, 220/564, 565, DIG. 24

(56) References Cited

U.S. PATENT DOCUMENTS

| | | |
|---|---|---|
| 2,177,369 | * 10/1939 | Lyon . |
| 2,850,083 | * 9/1958 | Frost . |
| 3,784,050 | 1/1974 | Pollack . |
| 4,172,573 | 10/1979 | Moore et al. . |
| 4,615,455 | 10/1986 | Tansill . |
| 4,878,591 | * 11/1989 | Johnston ............................. 220/651 |
| 4,925,057 | 5/1990 | Childress et al. . |
| 5,312,012 | 5/1994 | Zink . |

FOREIGN PATENT DOCUMENTS

| | | |
|---|---|---|
| 0 689 991 | 1/1996 | (EP) . |
| 746625 | 6/1933 | (FR) . |
| 2 001 015 | 1/1979 | (GB) . |
| 2 155 873 | 10/1985 | (GB) . |

* cited by examiner

*Primary Examiner*—Stephen Castellano
(74) *Attorney, Agent, or Firm*—Nixon & Vanderhye P. C.

(57) ABSTRACT

A baffle (1) for reducing hydraulic ram pressure in a liquid in a tank (5,9) in which it is located resulting from impact of a projectile on an external surface (6,10) of the tank, includes at least two outer walls (2) spaced apart to define therebetween at least one cavity (3) and a compressible gas or gaseous mixture at reduced, atmospheric or enhanced pressure contained in the cavity (3). The baffle outer walls (2) are sufficiently strong to withstand the pressure of the gas or gaseous material contained in the cavity (3) are sufficiently strong to resist the hydrostatic pressure of liquid in a tank (5,9), when the baffle (1) is located in the liquid in the tank (5,9), and are spaced apart by an amount sufficient to provide the cavity with a volume sufficient to allow a shock wave or waves in the liquid resulting from compression of the liquid by impact of a projectile on the tank external surface (6) to be reduced by expansion of the compressed liquid into the cavity volume. The gas or gaseous mixture has a density sufficiently different from the density of the liquid to provide substantially total reflection within the baffle (1) of the shock wave or waves impinging on the baffle.

7 Claims, 7 Drawing Sheets

BAFFLE FOR A LIQUID TANK

BACKGROUND OF THE INVENTION

1. Field of the Invention

This invention relates to a baffle for location in tank for liquid, which baffle is operable to reduce hydraulic ram pressure in the liquid resulting from impact of a projectile with an external surface of the tank, and to a tank containing such a baffle.

2. Discussion of Prior Art

A high speed projectile on impact with and penetration into a liquid containing tank generates very high pressure in the liquid which propagates as intense shock waves producing hydraulic ram pressure in the liquid. The shock waves and resulting hydraulic ram pressure in the liquid, combined with the penetration damage from the projectile, ran cause damage to the tank structure and frequently are the cause of catastrophic failure of the tank. The hydraulic ram pressure pulses are intense but of short duration which propagate through the liquid in the tank.

There is thus a need for means for reducing hydraulic ram pressure in the liquid in such a tank and for a generally improved tank which has an improved ability to sustain projectile impact without catastrophic failure.

SUMMARY OF THE INVENTION

According to a first aspect of the present invention there is provided a baffle for reducing hydraulic ram pressure in a liquid in a tank, when the baffle is located in the liquid in the tank, resulting from impact of a projectile with an external surface of the tank, which baffle includes at least two outer walls which are spaced apart to define therebetween at least one cavity, and a compressible gas or gaseous mixture at reduced, atmospheric or enhanced pressure, contained in the cavity, being sufficiently strong to resist the hydrostatic pressure of liquid in a tank, when the baffle is located in the liquid in the tank, with said baffle outer walls being sufficiently strong to withstand the pressure of the gas or gaseous material contained in the cavity and being spaced apart by an amount sufficient to provide the at least one cavity with a volume sufficient to allow a shock wave or waves in the liquid resulting from compression of the liquid by impact of a projectile on the tank external surface and thus on the liquid, to be reduced by expansion of the compressed liquid into the cavity volume thereby to reduce the hydraulic ram pressure in the liquid, and with the gas or gaseous mixture having a density sufficiently different from the density of the liquid to provide substantially total reflection within the baffle of the shock wave or waves impinging on the baffle thereby to reduce the hydraulic ram pressure in the liquid.

Preferably, the baffle outer walls are made of a plastics material, more preferably a polymeric material, Conveniently the baffle includes a honeycomb structure contained in and sub-dividing the at least one cavity.

Advantageously the gas or gaseous material utilised is air.

According to a second embodiment of the present invention, there is provided a tank for containing liquid, including at least one baffle according to the present invention.

Preferably the tank is such that the total cavity volume of the baffle or baffles in the tank is up to 10% by volume of the tank volume.

Conveniently the or each baffle is located in the tank so that a shock wave or waves resulting from compression of liquid, when in the tank, resulting from impact of a projectile on an external surface of the tank, impinges on at least one of the outer wails of the or each baffle and so that the shock wave or waves interact with the or each baffle before impinging on the tank external surfaces.

BRIEF DESCRIPTION OF THE PREFERRED EMBODIMENTS

For a better understanding of the present invention, and to show how the same may be carried into effect, reference will now be made, by way of example, to the accompanying drawings in which.

DETAILED DESCRIPTION OF THE PREFERRED EMBODIMENTS

Figure 1:
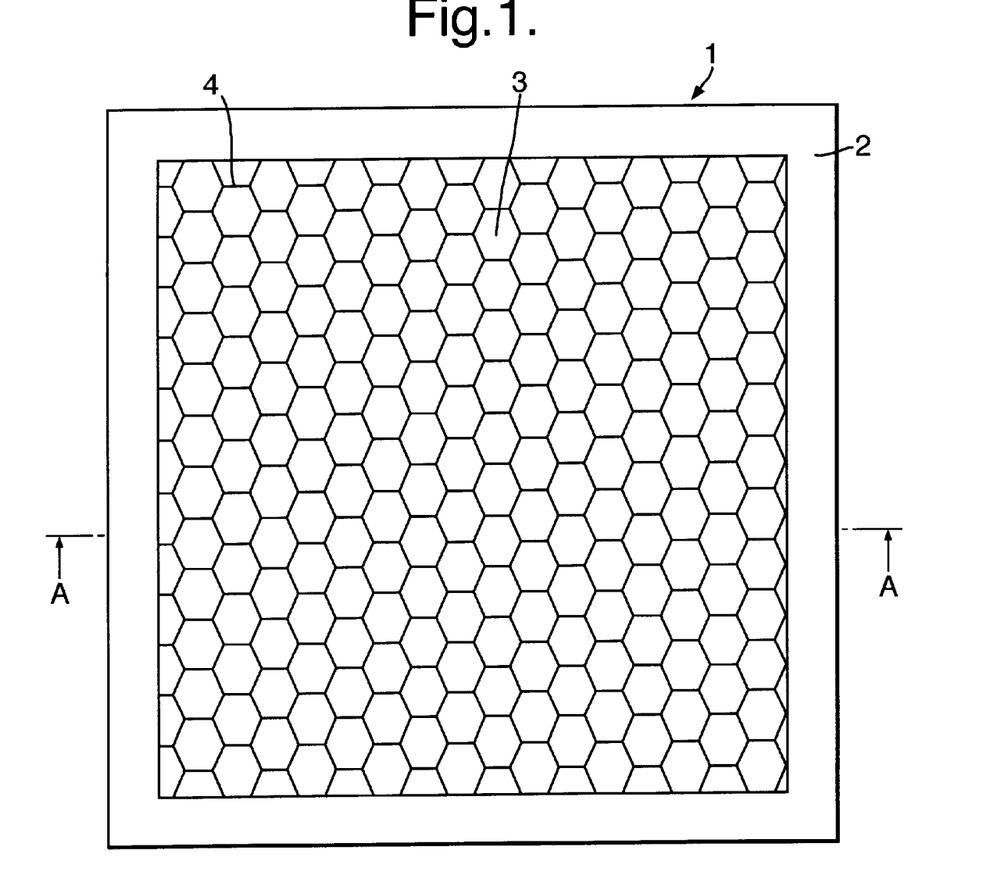
FIG. 1 is a plan view of a baffle according to one embodiment of the present invention.
Figure 2:
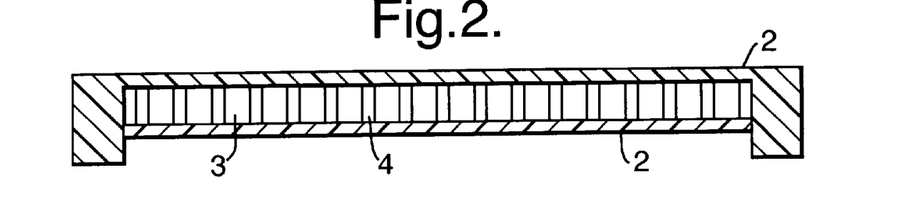
FIG. 2 is a cross sectional view through the baffle of FIG. 1 taken on the line A—A in FIG. 1.

As shown in FIGS. 1 and 2 of the present invention a baffle 1 according to a first embodiment of the present invention includes at least two outer walls 2 which are spaced apart to define therebetween at least one cavity 3. The baffle includes a compressible gas or gaseous mixture such as air at reduced, atmospheric or enhanced pressure contained in the or each cavity 3. In the embodiment of the invention illustrated in FIGS. 1 and 2 the baffle 1 includes a honeycomb structure 4 contained in and subdividing the at least one cavity 3. The honeycomb structure 4 is made from any convenient material such as plastics material. A suitable material is an automatic polymer such as manufactured under the name NOMEX (Trade Mark). The baffle outer walls 2 preferably are made of a plastics material with a polymeric material being particularly suitable.

Figure 3:
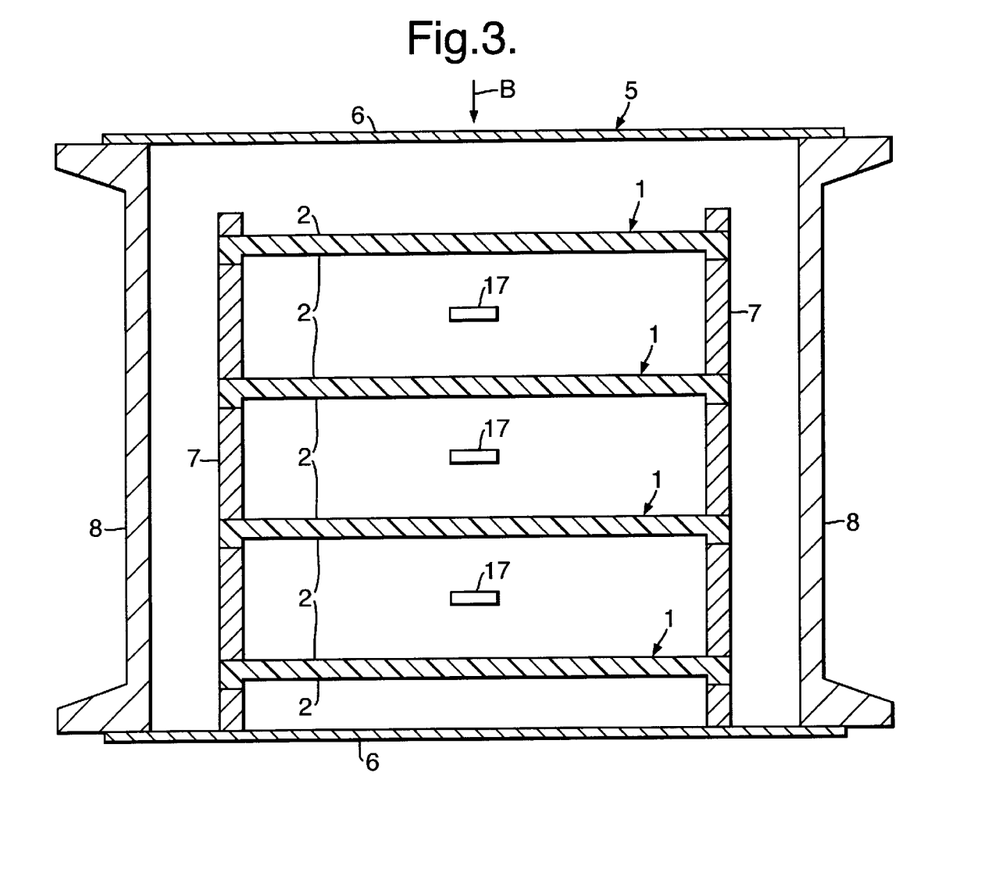
FIG. 3 is a vertical cross sectional view through a tank according to a further embodiment of the present invention shown including baffles according to the present invention.

The baffle 1 is intended for location in a liquid such as water or liquid petroleum fuel in a tank 5 and is operable to reduce hydraulic ram pressure in the liquid in the tank 5 resulting from impact of a projectile (not shown) with an external surface 6 of the tank 5. As shown in FIG. 3 there are preferably four baffles 1 located in the tank 5 in spaced apart substantial parallel overlying array in any convenient manner such as by means of locating walls 7. The baffle walls 2 are sufficiently strong to withstand the pressure of the gas or gaseous material contained in the cavity 3 and are spaced apart in each baffler by an amount sufficient to provide at least one cavity 3 with a volume sufficient to allow a shock wave or waves in the liquid in the tank 5, resulting from compression of the liquid by impact of a projectile on the tank external surface 6 and thus in the liquid, to be reduced by expansion of the compressed liquid into the cavity volume, thereby to reduce the hydraulic ram pressure in the liquid in the tank. Additionally, the gas or gaseous mixture in the or each cavity 3 has a density sufficiently different from the density of the liquid in the tank 5 to provide substantially total reflection within the baffle 1 of the shock wave or waves impinging on the baffle 1 thereby to reduce the hydraulic ram pressure in the liquid in the tank.

In the tank embodiment of the invention shown in FIG. 3 the baffles 1 may contain gas or gaseous material under reduced pressure or under atmospheric pressure. Preferably the gaseous material is air. The tank 5 as shown in FIG. 3 has additional side walls 8. Pressure transducers 17 are located as shown in FIG. 3 between the baffles 1 closest to the direction of impact A of a projectile on the external surface 6 of the tank 5. The transducers 17 measure the change of pressure consequent upon a shock wave propagating through the tank 5 following projectile impact on the surface 6 in the direction B.

Figure 4:
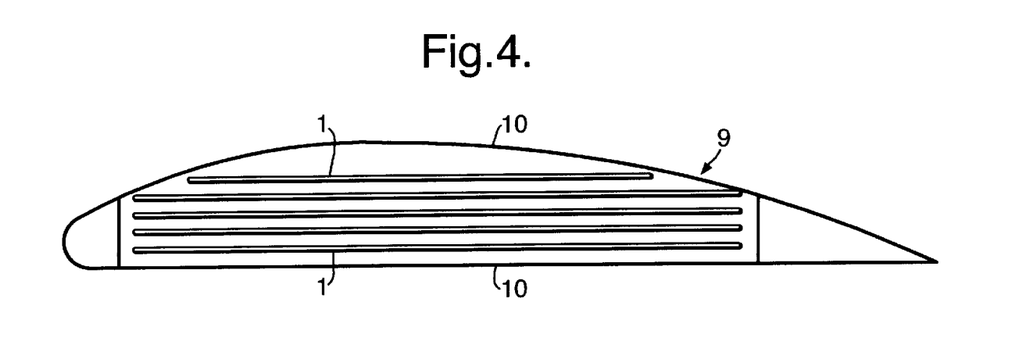
FIG. 4 is a cross sectional diagrammatic view through a wing tank according to a further embodiment of the present invention.

A tank according to a further embodiment of the present invention is shown in FIG. 4 in the form of an aircraft wing tank 9 with the outer skin of the wing providing the external surface 10 of the tank 9. In this embodiment the tank contains five baffles 1 according to the pre-sent invention in overlying substantially parallel spaced apart array.

The total cavity volume of the or each baffle 1 in the tank 5 or 9 is up to 10% by volume of the tank volume, Additionally, the or each baffle 1 is located in the tank 5 or 9 so that a shock wave or waves resulting from compression of the liquid in the bank resulting from impact of a projectile on the external surface 6 or 10 impinges on at least one of the outer walls 2 of the or each baffle and so that the shock wave or waves interact with the or each baffle 1 before impinging on the tank external surface.

The baffles 1 are placed in the tank 5, 9 such that the shock pulse will impinge on the baffle before reaching a tank wall (see FIG. 2). In defeating the hydraulic ram pressure the baffles serve two functions. Firefly energy from the hydraulic ram shock wave is absorbed by expansion of the liquid into the space created by irreversible compression of the baffle, Secondly, each baffle due to the large shock impedance mismatch between the baffle and the liquid in the tank behaves as a good shock wave reflector and a poor shock wave transmitter. Through multiple shock wave reflections in the tank and the attenuation properties of the liquid, the shock wave amplitude is reduced and consequently the pressure experience by the tank structure is diminished.

Tests were performed to evaluate the performance and function of the internal baffles. In the first instances a series of control tests were undertaken effectively to establish baseline parameters against which the alleviation characteristics of the baffle could be quantitatively evaluated. For these tests two steel framed tanks having skins of aluminum alloy 2014A were used. Aluminum Alloy 2014A contains by weight, from 0.5 to 0.9% Silicon, up to 0.5% iron, from 3.9 to 5.0% copper, from 0.4 to 1.2% manganese, from 0.2 to 0.8% magnesium, up to 0.1% chromium, up to 0.1% nickel, up to 0.25% zinc, and up to 0.2% titanium plus zirconium, with balance, apart from impurities and incidental constituents, being aluminum, The first of these tanks, of internal dimensions 535 mm×205 mm×250 mm, with transparent sides, was also used to permit visualisation of the shock processes occurring in the fluid. The projectile use for this study was a 7 gramme hardened steel cube. Tests were performed at projectile velocities between 1800 m/s and 2100 m/s. In all tests the projectile impact was at the centre of the large external surface 6 of the tank 5 at normal incidence. A number of diagnostic techniques have been employed to provide detailed quantitative data. Principally these are determination of the shock pressure in the liquid, observation of the shock wave using high speed photography, projectile velocity measurement and examination of the damage to the tank structure, in particular the exist surface of the tank.

Figure 5:
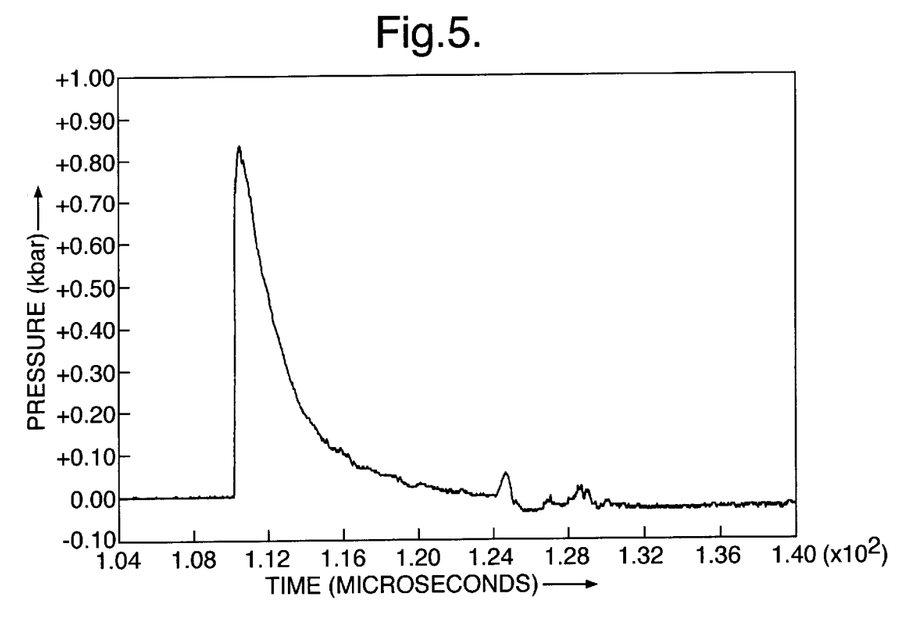
FIG. 5 is a graphical plot of the shock wave pressure against time for a high speed projectile impact into a water filled tank at a velocity of 2009 meters per second.
Figure 6:
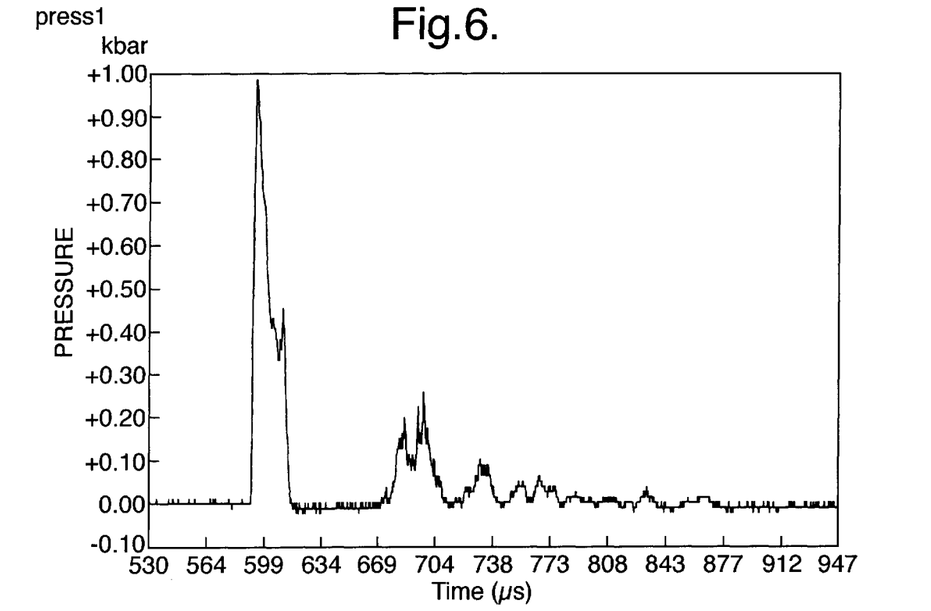
FIG. 6 is a graphical plot of shock wave pressure against time for a high speed projectile impact into a water filled tank according to the present invention containing four baffles according to the present invention having cavities under reduced pressure measured via a sensor located approximately 100 millimetres from the impact point and between the first and second baffles.
Figure 7:
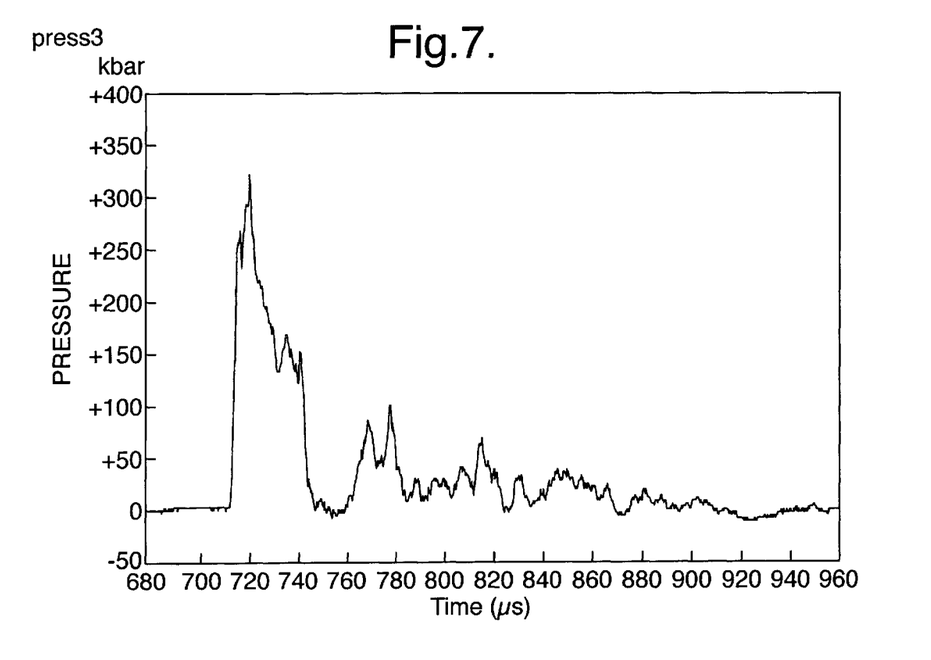
FIG. 7 is a graphical representation of shock wave pressure against time for impact of a high speed projectile into a water filled tank according to the present invention containing four reduced pressure cavity baffles according to the present invention with the pressure sensor being located in the tank approximately 210 millimetres from the impact point and between the third and fourth baffles.
Figure 8:
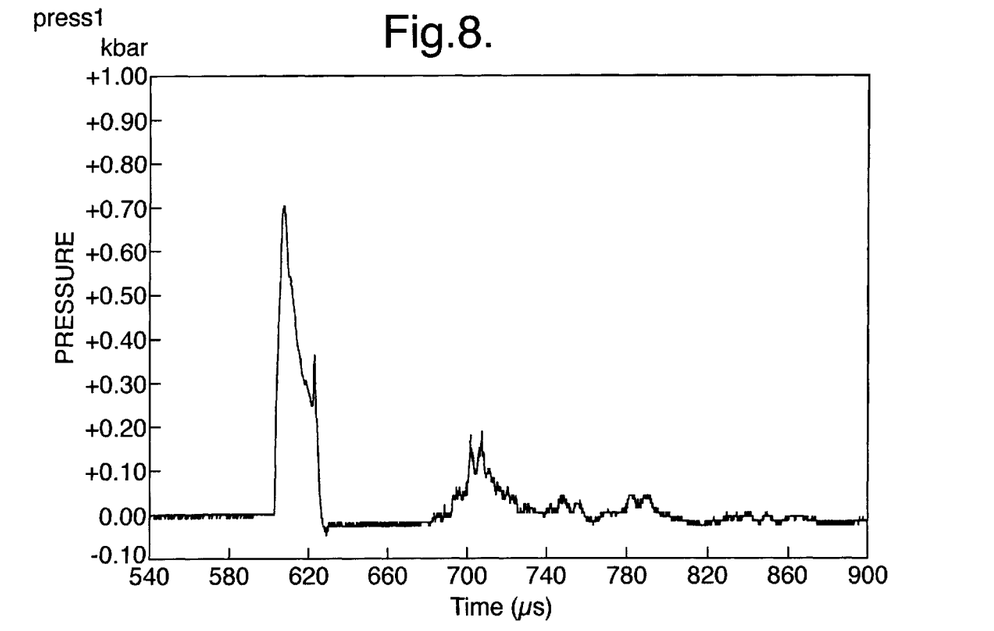
FIG. 8 is a graphical plot of hydraulic pressure against time for impact of a high speed projectile into a water filled tank according to the present invention containing four baffles according to the present invention whose cavities are at atmospheric pressure, with the pressure sensor being located approximately 100 millimetres from the impact point in the water and between the first and second baffles.
Figure 9:
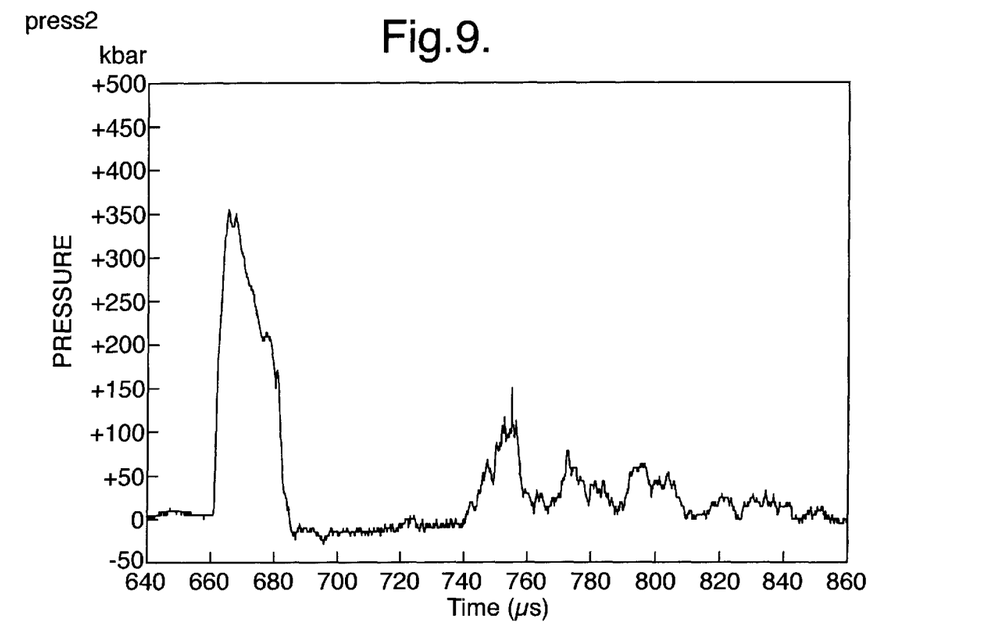
FIG. 9 is a graphical plot of hydraulic pressure against time for the impact of a high speed projectile into a water filled tank according to the present invention containing four baffles according to the present invention whose cavities are at atmospheric pressure, with the pressure sensor being located in the water in the tank approximately 155 millimetres from the impact point and between the second and third baffles.
Figure 10:
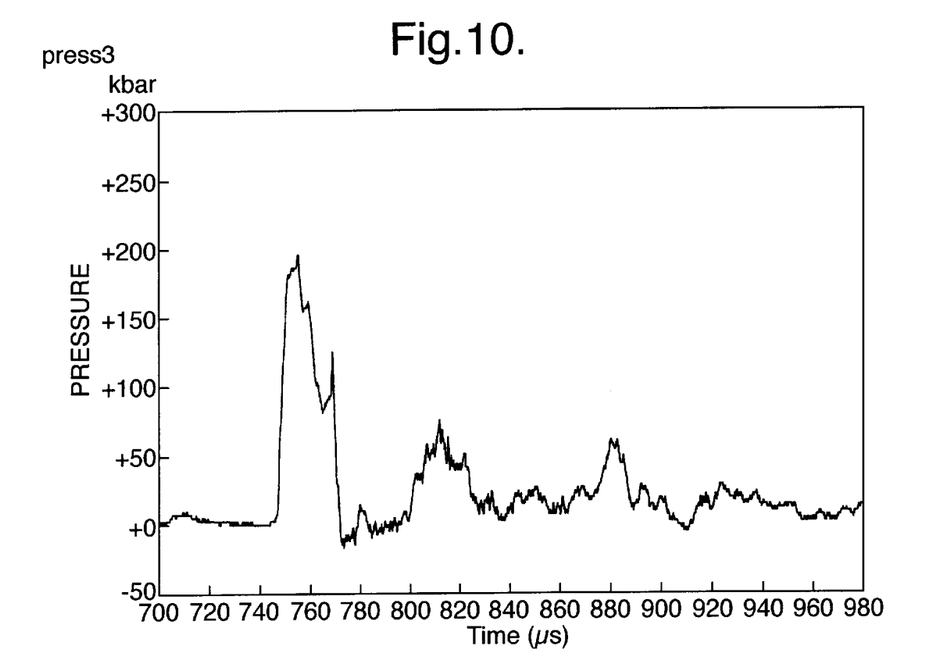
FIG. 10 is a graphical plot of hydraulic pressure against time for the impact of a high speed projectile into a water filled tank according to the present invention containing four baffles according to the present invention whose cavities are at atmospheric pressure, with the pressure sensor being located in the water in the tank approximately 210 millimetres from the impact point and between the third and fourth baffles.

In the control tests, performed without baffles in the tank, the shock pressure as a function of time at various locations within the tank were recorded for a number of tests. A typical example of the shock pressure as a function of time is given in FIG. 5. The shock wave pressure profile has a fast leading edge to a maximum pressure followed by a slower smooth decay and are characterised by a pulse width of approximately 40 μs. The maximum pressure observed and pulse width are dependent upon the projectile velocity and location of a pressure sensor in the tank relative to the impact point. (Subsequent tests have shown that projectile size and mass also affect the shock pressure profile). The shock wave pressure decreases as the distance from the impact point increases due to dispersion and decay processes. High speed photographic images of the propagating shock, further emphasize the well defined spherical shock front ahead of the projectile. As the projectile passes through the liquid, a cavity is formed to the rear of the projectile. This initially expands due to acceleration of the liquid and a later time collapses as release waves return from the tank walls. The high pressure associated with the shock wave causes extensive deformation of the rear tank wall surface. This damage is further enhanced by the projectile penetration of the rear wall which causes extensive "petalling" failure of the exist skin of the tank.

Tests performed with baffles, according to the present invention located in the tank, using the same mass of projectile and velocity as above, produced the following results. In the test example quoted, four baffles were utilised with equal spacing between them, the last baffle being approximately 20 mm from the exist skin of the tank, and in an orientation Such that the plane of the baffle was normal to the velocity vector of the projectile. The baffles had an area of approximately 200 mm×200 mm and total thickness of 6 mm. The shock pressure—time profiles obtained at various tank locations are shown in FIGS. 6 to 10. By comparison with those obtained In the non-inventive tank test, FIG. 5, it is evident that the shock wave is disrupted. A fast rise time is still observed, but the smooth decay of the pulse is disrupted. The structure observed in the decay of the pulse is related to the number of baffles penetrated by the projectile and in the path of the shock wave. In addition, the shock pulse width is reduced. More significant, the peak shock pressure is less than for the baffle free tank results shown in FIGS. 11 and 12 which will be discussed later, The reduction in shock pressure becoming greater as the shock wave impinges upon more baffles. Pressure reductions of a factor of five compared to the control tests have been observed.

Figure 11:
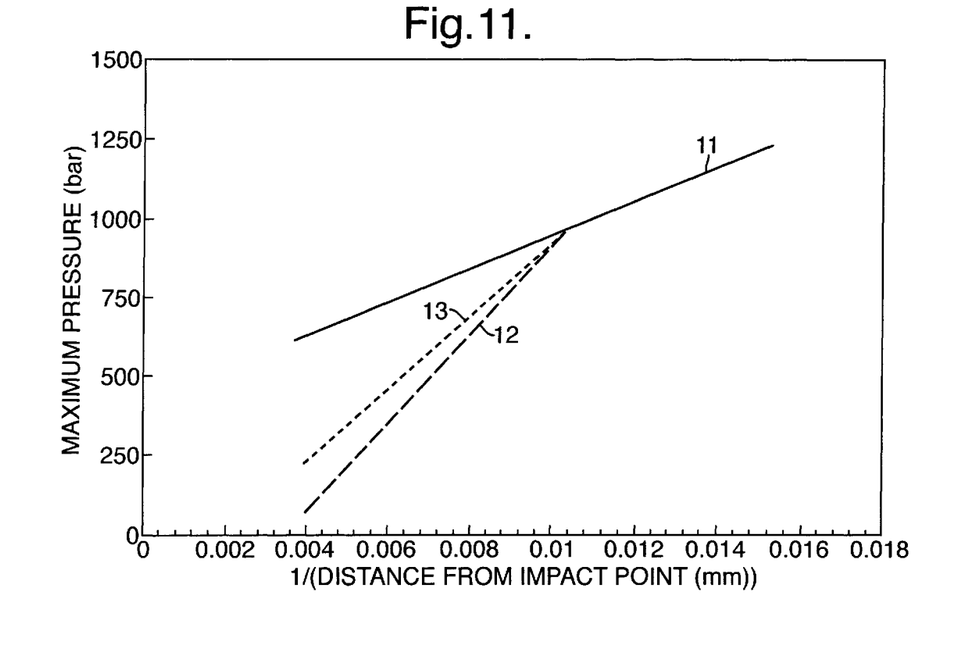
FIG. 11 is a graphical plot of maximum shock pressure in bars against the reciprocal of the distance from impact point in millimetres for the impact of a high speed projectile into a water filled tank according to the present invention containing four baffles according to the present invention contrasted with results for a baffle-less water filled tank not according to the present invention.

FIG. 11 shows at line 11 the pressure change with reciprocal of distance from impact for a baffle less water filled tank not according to the invention. Line 12 shows pressure change for a baffle containing water filled tank of the invention in which the baffles contain a vacuum and line 13 shows the pressure change for baffles containing air, It can be seen that the presence of baffles considerably reduces the maximum shock pressure in the tank on impact by a projectile. The effect is similar for both vacuum and air containing baffles.

Figure 12:
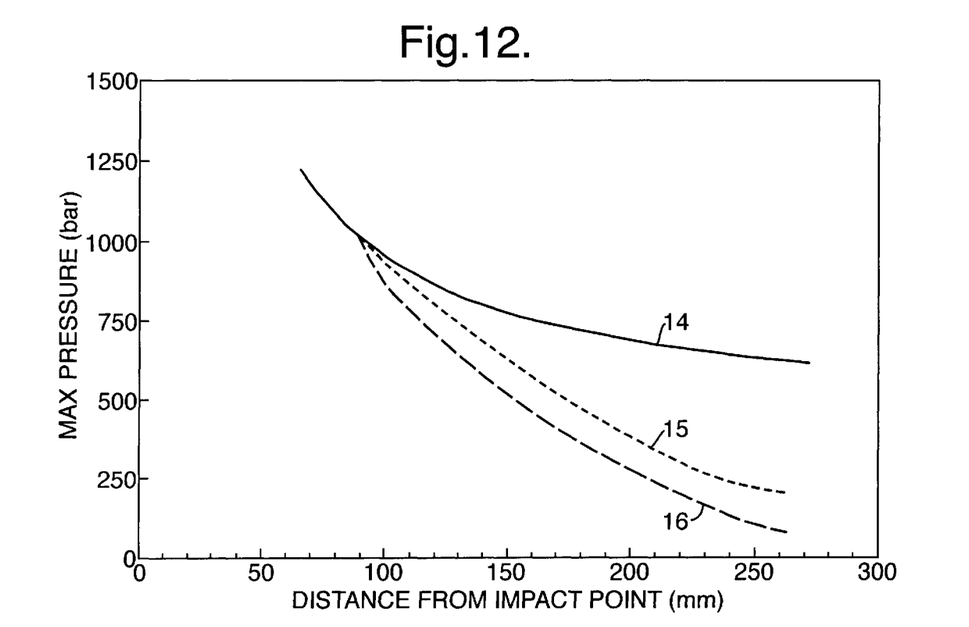
FIG. 12 is a graphical representation of maximum shock pressure in bars against the radial distance from the impact point in millimetres for a high speed projectile into a water filled tank according to the present invention containing four baffles according to the present invention, contrasted with results for a baffle-less water filled tank not according to the present invention.

FIG. 12 shows at line 14 the pressure change with distance from impact for a baffle less water filled tank not according to the invention. Line 15 shows a pressure change for a baffle containing water filled tank of the invention in which the baffles have plastics material walls and are air containing. Line 16 shows the pressure change for plastics material baffles containing a vacuum. Once again it can be seen that the presence of the baffles in the tank considerably reduces the maximum shock pressure in the tank on impact by a projectile.

High speed photographic images of the shock wave propagation show the processes occurring. In the first instance the shock wave forms ahead of the projectile as in the "baffle free tank" teat. As the shock wave propagates through the tank it impinges upon a baffle. The baffle presents a barrier to the propagation of the shock due to the large difference in shock impedance. Reflection of the shock Wave Occurs quickly followed by cavitation of the liquid. The projectile continues to travel across the tank and penetrates the baffle. As the projectile exists the baffle a shock wave is formed which moves ahead of the projectile. This shock continues to propagate until it reaches the next baffle. Again, due to the difference in impedance between the baffle and the liquid, the shock wave is reflected and the process is repeated. As a consequence of perforating a number of baffles 1, in this case four, the shock pressure is diminished and hence the damage sustained by the tank structure is decreased. The rear tank wall of the baffle containing tank does not show the extensive deformation and petalling type failure observed previously. The only damage sustained by the rear tank wall is a small perforation and hole and bulge produced by the projectile as it passes through. During pressure reduction process the baffles are irreversibly compressed and depending on the materials used for construction suffer extensive damage.

The operating principle of the baffle 1 relies on two mechanisms. Firstly, energy is absorbed from the shock wave by allowing the liquid to expand through irreversible compression of the baffles 1. Secondly, the baffles present a high impedance to the propagating shock wave causing reflection of the wave.

The operating principle of energy absorption from the shock wave is such that the baffle should collapse on a timescale which is comparable with the shock pulse duration. This consideration determines the thickness of the baffle. For example, consider a shock pulse of duration $t_p$ and pressure P. Simple shock wave analysis shows that the velocity of collapse of the baffle wall, V., is given by:—

$$V = \frac{2P}{\rho_f c_f} \tag{1}$$

where $\rho_f$ and $c_f$ are the density and shock velocity of the liquid respectively Hence the time for collapse, $\Delta t$, is approximately $$\Delta t \sim h/V \tag{2}$$

where h is the thickness of the baffle in the direction of collapse.

For high speed projectile impacts typical of bullets and missile fragments h is of the order of a few millimetres. Baffles which are too thin will totally collapse during part of the shock pulse providing a shock path for the remainder of the pulse to continue without reflection or absorption of energy. To permit ready compression, the baffle should contain air at enhanced pressure, atmospheric pressure or less, Test results have shown (hat vacuum baffles ($10^{-3}$ bar) and baffles at atmospheric pressure function successfully. Tests show that the baffle volume required is approximately 10% (or less) of the tank volume.

The shock wave reflection characteristics of the baffle 1 are characterised by well known shock wave transmission and reflection characteristics. A shock wave on encountering a change in shock impedance such as between two different materials, produces a reflected wave into the original medium and forward travelling transmitted wave. The amplitudes of the transmitted and reflected wave are given as follows:-

Transmission $$P_t = P_i \frac{2Z_2}{Z_1 + Z_2} \tag{3}$$

Reflection $$P_r = P_t \frac{Z_2 - Z_1}{Z_1 + Z_2} \tag{4}$$

where $P_i$ is the incident shock pressure, $P_t$ the transmitted shock pressure. $P_r$ the reflected shock Pressure and $Z_1$ and $Z_2$ are the shock impedances of the first and second materials respectively.

As the shock propagates through the liquid and hits the baffle reflection and transmission of the shock will occur as dictated by the above equations. For air filled and vacuum baffles $Z_1 \gg Z_2$, hence no shock pulse is transmitted through the baffle providing a space is maintained between the walls of the baffle, Once the walls of, the baffle are intimate contact, $Z_2 = Z_1$ and the shock pulse can propagate. In addition, on perforation of the baffle by the projectile a second shock will be generated which must be reduced by further baffles ahead of the propagating shock. It will also be noted that a reflected shock pulse is formed of magnitude equal to the incident shock, but of opposite sign. This tensile reflected wave acts to unload the incident shock and subsequently produce cavitation in the fluid.

The use and design of the baffles must follow the following basic principles. The position of the baffles within the tank must be such that the shock impinges on the outer wall 2 of the baffle producing collapse of the baffle through the thickness. Furthermore the baffles should be placed such that the shock wave produced by the event interacts with the baffle before impinging upon the tank structure. The area of the baffle 1 should, therefore, be comparable with the cross sectional area of the tank 5. An important consideration in positioning the baffles is to provide distributed compressibility homogeneously throughout the tank. A number of baffles 1 should be employed over a distance comparable with the effective pulse length in the liquid. A schematic showing possible baffle placement in a wing tank is given in FIG. 4.

As the shock wave propagates through the liquid contained the baffles, it performs irreversible work compressing the baffles and consequently loses energy.

Initially consider the whole system of the fluid and baffles. The energetic balance may be represented as follows.—

$$P(V_\infty - V) =_g + U_1 + T + \Delta Q \tag{5}$$

where P is the shock pressure, $V_\infty$ the initial volume of the system, T kinetic energy and $\Delta Q$ heat generated in the system. $U_1$ and $U_g$ are the potential energies of the compressed liquid and gas respectively.

The energy lost by the shock wave in compressing the baffles may be represented as $$dW - f_c P t dV \tag{6}$$

where $\tau$ is the volume fraction of the baffles compared to the liquid, $f_0$ is a factor representing the degree of compression of the baffles and has a value of $\frac{1}{3} < f_c < 1$ and dV is the volume element of the shock wave.

To simplify the calculations assume the ideal case in which the baffles are compressed to practically zero volume, hence $f_c = 1$. $dV = 4\pi r^2 \, dr = 4\pi r^2 c_L \, dr$ is the volume the shock wave takes and $C_L$ is the velocity of the shock wave which for simplicity is constant and equal to the sound velocity in the pure liquid.

Clearly, to reduce the energy of the shock wave to such a level that it will cause no damage to the tank structure, the energy lost by the shock wave in compressing the baffles must be approximately equal to the initial energy of the shock wave.

In the first approximation, the shock wave may be represented as a spherical one of the form:—

$$P = A/r \exp(-t/t_o) \tag{7}$$

where r is the distance from the impact or shock wave source, A is the shock wave amplitude and $t_o$ defines the shock pulse duration. The energy of the shock wave $E_{sh}$ is thus given by:—

$$E_{sh} = \int_0^\infty \frac{P^2}{\rho_L c_L^2} 4\pi r^2 c_L \, dt = \frac{2\pi A^2 (c_L t_0)}{\rho_L c_L^2} \tag{8}$$

Where $p_L$ is the density of the liquid and $c_L$ is the shock wave velocity

As the projectile propagates through the liquid, its velocity and hence kinetic energy reduce very quickly. To a good approximation, it is assumed that the kinetic energy of the projectile is transformed in to shock wave energy. Hence:—

$$T_p \frac{m_p V_p^2}{2} \tag{9}$$

where $T_p$ is the kinetic energy of the profile, $M_p$ is the mass of the projectile and $V_p$ is the velocity of the projectile. and consequently from equation (8):—

$$A = \sqrt{\frac{T_p \rho_L c_L^2}{2\pi (c_L t_0)}} \tag{10}$$

Comparing the energy lost by the shock wave in compressing the baffles (equation 6) with the shock wave energy (equation 8) we have:—

$$-dW = dE_{sh} = \frac{4\pi A \, dA}{\rho_L c_L^2} (c_L t_0) \tag{11}$$

Noting that the time for collapse of the baffles is comparable to the shock pulse duration i.e. $t = t_0$ and consequently $\exp(-t/t_0) = 0.37$. Using equations (6) and (10), the differential equation (11) can be rewritten as:—

$$\frac{dA}{dr} = -\frac{0.37 \tau \rho_L c_L}{t_0} r \tag{12}$$

The solution of this equation is of the form:—

$$A = A_0 - \frac{0.37 \tau \rho_L c_L}{2 t_0} r \tag{13}$$

where $A_D$ is the initial amplitude of the shock wave. Assuming $A = 0$, a critical distance can be found at which the shock pressure decreases to practically zero.

$$r_{cr} = \sqrt{\frac{2 A_0 t_0}{0.37 \rho_L c_L \tau}} \tag{14}$$

For example, for $\tau = 10\%$ and $A_0 = 2 \times 10^7$ N/m and $t_0 = 40 \, \mu s$ (typical) parameters from tests performed), the critical radius for effective extinction of the shock wave is approximately $r_{cr} \sim 17$ cm. Clearly, this simple estimate for $r_{cr}$ is optimistic because it has been assumed that all the baffles are compressed instantly and completely. It should be noted, that this analysis does not take into account the shock reflection characteristics of the baffle which would tend to further reduce the critical radius. In simple tests, the shock energy was dissipated over a distance of approximately 25 cm. Further tests are required with effectively smaller volume fractions of baffles to fully test this simply analysis. Taking the experimental observation of shock wave extinction over a distance of 25 cm, and using the parameters of $A_D$ and $t_o$ given above, potentially, τ could be reduced to 5%.

In spite of the limitations of this analysis, it does provide a simple relation between shock parameters and the physical dimensions of the baffle system which has been shown to be in agreement with experimental observations.

What is claimed is:

1. A tank for containing a liquid, said tank reducing hydraulic ram pressure in said liquid resulting from a shock wave from passage of a projectile through said tank, said tank comprising:

a plurality of baffles located in said tank, each said baffle comprising spaced apart walls defining a cavity therebetween, each cavity at least partially filled with a compressible gaseous material, said baffle walls being sufficiently strong to contain said gaseous material and withstand any hydrostatic pressure of said liquid;

said baffles are mounted in a substantially parallel spaced apart position within said tank; and said gaseous material having a density substantial different from said liquid thereby providing reflection of said shock wave.

2. A tank according to claim 1, wherein the baffle walls are made of a plastics material.

3. A baffle tank according to claim 2, wherein the baffle walls are made of a polymeric material.

4. A tank according to claim 1, including a honeycomb structure contained in and sub-dividing at least one cavity.

5. A tank according to claim 1, wherein the gaseous material utilized is air.

6. A tank according to claim 1, wherein the total cavity volume of the baffles in the tank is up to 10% by volume of the tank volume.

7. A tank according to claim 1, wherein each baffle is located in the tank so that said shock wave resulting from compression of liquid, when in the tank, resulting from impact of a projectile on an external surface of the tank, impinges on at least one of the walls of each baffle and so that the shock wave interacts with each baffle before impinging on the tank external surfaces.

* * * * *